Aug. 8, 1950   P. C. HUTTON   2,517,791
RUBBER BEARING

Filed Aug. 5, 1947   2 Sheets-Sheet 1

INVENTOR.
Philip C. Hutton.
BY
Harness, Dickey & Pierce.
ATTORNEYS.

Aug. 8, 1950 P. C. HUTTON 2,517,791
RUBBER BEARING

Filed Aug. 5, 1947 2 Sheets-Sheet 2

INVENTOR.
Philip C. Hutton.
BY
Harness, Dickey & Pierce.
ATTORNEYS.

Patented Aug. 8, 1950

2,517,791

UNITED STATES PATENT OFFICE 2,517,791

RUBBER BEARING

Philip C. Hutton, London, England, assignor to Silentbloc, Limited, London, England, a company of Great Britain Application August 5, 1947, Serial No. 766,205
In Great Britain September 4, 1946

12 Claims. (Cl. 287—85)

The present invention relates to an improved bearing or yielding mounting of the type employing a pair of concentric bearing members connected by an intermediate annular bushing of rubber or the like which adheres to the members and permits limited rotation and axial and radial movement of one of the members relative to the other, and particularly to a bearing or mounting of this type which is subject to axial loads.

In the past, bearings of the type mentioned in which the rubber bushing was located entirely within the confines of both bearing members have been found subject to endwise creeping under intermittent axial loads. They are also unable to sustain substantial axial loads. It has been proposed that abutment shoulders be provided on the inner bearing member and that the rubber bushing project beyond the ends of the outer member and engage the shoulders (see British Patent No. 437,114, of 1934), or that rubber bumpers be provided between the shoulders and the ends of the outer member, in order to prevent creeping and increase the resistance to axial loads. These expedients have, however, been of little benefit for the reason that the projecting ends of the bushing or the bumpers are pinched between the shoulders and the ends of the outer member and thus destroyed before the axial load reaches a value materially in excess of that which could be sustained without the projecting ends or bumpers.

Accordingly, it is the principal object of the present invention to provide a bearing or mounting of the type mentioned which is capable of withstanding much higher axial loads than prior bearings without creeping or destruction.

A further object of the invention is to provide a bearing of the type mentioned which is characterized by its longer life under repeated oscillations.

A further object is to provide a bearing of the type mentioned which may be assembled as a complete unit for subsequent installation and which is peculiarly suited to meet the requirements of bearings in vehicle suspensions such as those used in spring eyes, shackles and independent suspension arms.

Other objects and advantages of the invention will become apparent from the following specification, the accompanying drawings and the appended claims.

Figure 3:
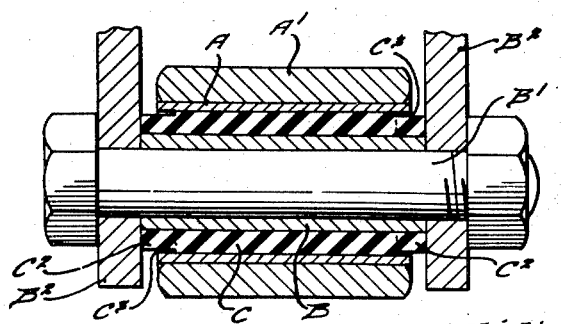
Figure 3 shows the bearing illustrated in Figure 1 assembled in usual manner in a spring shackle assembly.
Figure 5:
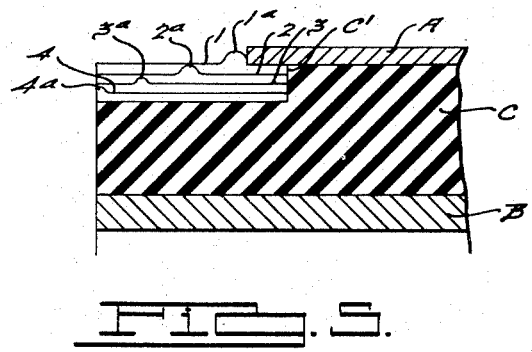
Figure 6:
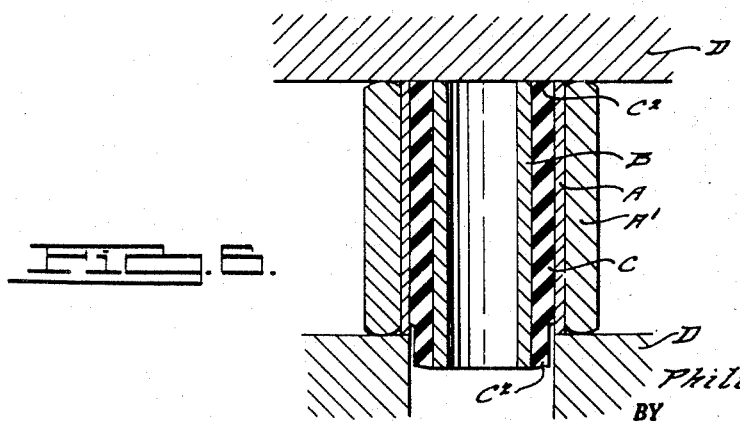

Figure 5 indicates how the dimensions of the clearance spaces in a bearing according to the invention can be determined in relation to the end load the bearing is desired to withstand without damage; and Figure 6 is a similar view to Figure 3, showing the effect of end load on a bearing according to the invention designed to withstand the optimum end load for given conditions without risk of damage to the rubber bushing.

In accordance with the present invention, a very substantial improvement in performance is achieved by providing a radial clearance between one or both ends of the bushing and the adjacent portion of one of the bearing members and providing a shoulder or shoulders on the other bearing member which abuts the end or ends of the bushing. Where axial loads may be applied in both directions, the construction of the bearing is the same at both ends, otherwise the clearance and abutment need only be provided at the end at which the one member approaches the shoulder when the bearing is subject to axial load. The bushing, which may be made of yieldable natural or synthetic rubber or any rubber-like material, has a strong adherence to the inner and outer bearing members, except at the end or ends where the radial clearance is provided. This adherence may be obtained by any suitable rubber cementing material, in accordance with standard practice, or, as is preferred, by radially compressing a molded rubber bushing between the inner and outer bearing members.

The preferred form of bearing, shown in Figures 1, 2, 3, 5 and 6 for purposes of illustration, is of the radially compressed type and is designed for use in an automobile spring shackle in which the principal loads are radial but substantial end loads in both directions are encountered. It comprises an external bearing member A having a cylindrical inner surface, an internal bearing member B having a cylindrical outer surface, and an intermediate rubber bushing C. The members A and B may be of any suitable rigid material, but as shown are in the form of cylindrical metal sleeves, the inner sleeve B being adapted to receive a bolt $B^1$ which secures the side plates $B^2$ of the shackle against the ends of the inner sleeve, as shown in Figure 3, so that the side plates form the abutment shoulders for the ends of the rubber bushing. It will be appreciated that the shoulders which abut the ends of the rubber bushings may be formed on or secured in position with respect to the inner member B in any other desired manner.

The outer sleeve A may be fitted within any desired member, such as the eye $A^1$ of a vehicle leaf spring, and the side plates are connected at their opposite ends in any desired manner, not shown, to another member, such as the vehicle frame, for pivotal movement about an axis parallel to the axis of the bearing.

In the particular installation mentioned, the spring eye $A^1$ transmits the vehicle supporting force radially through sleeve A to the rubber bushing C, thence to the vehicle frame through sleeve B, bolt $B^1$ and the side plates $B^2$. When the vehicle negotiates curves or hits obstructions which exert lateral forces, the gearing is subject to axial loads which tend to shift the sleeve A axially with respect to sleeve B in one direction or the other. The bearing should be designed to transmit the maximum axial loads which will ordinarily be encountered entirely through the rubber bushing, without metal to metal contact between the ends of sleeve A and the side plates, thus eliminating noise and friction. However, such metal to metal contact may occur momentarily under abnormal conditions. In any case, the adherence between the rubber bushing and the members A and B must be such that no slipping or creep occurs between the rubber and either of the members, so that the tendency of the rubber to return toward its free state will always return the external member A to its initial position midway between the side plates $B^2$.

An essential feature of the bearing resides in the provision of end portions $C^2$ on the rubber bushing, which, on assembly, are of less diameter than the inner diameter of the external member A. These end portions extend at least partially within the outer member to provide a small annular clearance space $C^3$. In addition, when the end shoulders of the inner bearing member are of larger diameter than the inner diameter of the external member A, so that metal to metal contact between the shoulders is possible, as is preferred, the end portions $C^2$ must also extend beyond the ends of the external member A in order to permit axial deflection of the members A and B relative to each other. In any case, the shoulders on the inner member must be of a diameter almost equal to the inner diameter of the external member A, or larger. Hereinafter, these end portions on the rubber bushing, which extend axially beyond the area of contact between the rubber bushing and one of the bearing members and which engage end abutments on the other bearing member, are referred to as extensions.

It has been established by exhaustive tests that a bearing having properly designed extensions will provide much greater resistance to axial load for a given deflection than an identical bearing with the extensions removed. To illustrate, the following deflections were obtained for the same loads on two such bearings:

| Axial load | Deflection with extensions | Deflection without extensions |
|---|---|---|
| Pounds | Inches | Inches |
| 50 | .0154 | .017 |
| 100 | .0219 | .0403 |
| 150 | .0398 | .069 |
| 175 | .0441 | .0839 |

As a result of the added axial load capacity, it is possible to use smaller bearings than would be required in the absence of extensions. This is particularly important where space is limited or cost is critical.

In addition, it is found that bearings provided with such extensions are entirely free from creep or permanent axial displacement such as is frequently encountered in the absence of extensions.

The provision of sufficient clearance space $C^3$ is found essential to the realization of the increased axial load capacity of the bearing. In any form of bearing in which the rubber bushing projects beyond the end of the external member and engages a shoulder on the inner member, movement of the external member toward the shoulder on the inner member produces what is referred to herein as a compression bulge in the projecting portion of the rubber bushing. In the absence of the annular clearance space $C^3$, the compression bulge in the projecting portion of the bushing is pinched between the end of the external member and the shoulder, in the manner illustrated in Figure 4, and destroyed before the full axial load sustaining stress is applied to the main body of the rubber bushing. Thus, for example, in an otherwise satisfactory form of bearing, in the absence of such a clearance space the compression stress on the compression bulge exceeded the maximum permissible when the total axial load on the bearing was only about fifteen per cent of the load which could be sustained by an identical bearing provided with adequate clearance space $C^3$.

This surprising improvement in axial load capacity resulting from extensions provided with an annular clearance space is believed to be due to several factors. In the first place, the clearance space delays the bulging of the extensions and thus permits greater axial deflection and the imposition of a higher stress on the main body of the rubber bushing. Secondly, assuming an end thrust tending to move the inner member B to the right, the inner circumferential portion of the extension moves axially to the right with the member B and the left-hand end of the central zone of the bushing assumes a generally frusto-conical form and the shoulder on the inner member forces the extension into this frusto-conical "space," thus subjecting the entire body of the rubber bushing to what is more or less equivalent to hydraulic pressure which sustains additional axial load. Other phenomena are also believed to contribute to the observed results.

Figure 4:
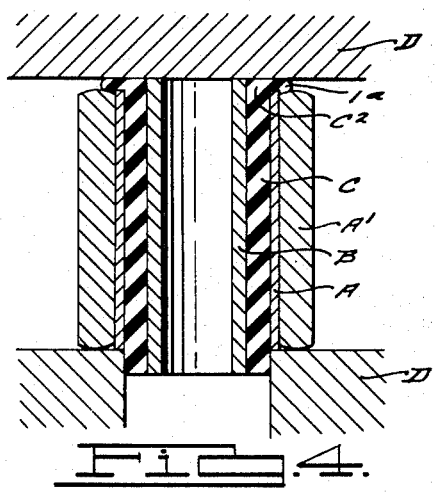
Figure 4 shows the effect of axial force on a previously known type of bearing of the kind to which the present invention relates.

The optimum amount of annular clearance depends upon the dimensions of the bearing, the hardness of the rubber, and the radial and axial load which it is called upon to sustain. Accordingly, for any given set of conditions, the simplest method of determining optimum clearance is by trial and error in the light of the guiding principles set forth hereinafter. Thus, in Figure 5 is illustrated on an enlarged scale the effect of variations in the radial clearance space on the performance of a typical bearing under axial load, the cross-hatched rubber bushing C representing optimum proportions and the lines 1, 2, 3 and 4 representing clearances which increase from zero toward the optimum. Line 1 represents a bushing having zero clearance. It has been found that application of an axial load tending to move the inner member B toward the right immediately produces a bulge of the type and located as indicated by the indicia 1a. As the load is increased, the bulge increases, and eventually may be nipped between the external member A and the side plate, as indicated in Figure 4. Even in the absence of actual cutting of the rubber, a fairly heavy load, once applied and released, will leave a mark on the bushing immediately adjacent the end of the external member.

If now a clearance space is provided of comparatively small dimensions by reducing the external diameter of the end of the bushing as shown at 2 in Figure 5, it will be found that, upon application of a relatively small end load, the projecting end part of the bushing will not bulge into contact with the end of the external member but upon application of a heavier end load it will so bulge, with the result that, on subsequent relief of the end load, the circumferential marking on the bushing where it engaged the end of the external member will be at a small distance from the plane of the end of the external member, as indicated at 2a in Figure 5. If now the clearance space is further increased as indicated by the line 3 in Figure 5, the circumferential mark made upon the projecting end of the bushing where it comes into contact with the end of the external member on application of a sufficiently great end load will move still further along the bushing as indicated in 3a in Figure 5. Similarly, with larger clearance, as indicated by the line 4, the bulge and mark will be located at 4a. Finally, by making the clearance space sufficiently large, no such circumferential marking will appear at all, due to the fact that the projecting end of the bushing completely enters the end of the external member before it has bulged sufficiently to make contact with the end of the external member. Thus, on the application of the maximum end load, the condition indicated in Figure 6 is reached, and this is the condition which is to be aimed at if the bearing is intended to resist the maximum end load of which it is capable without risk of damage to the rubber.

It will be understood that by trial and error methods based on the above description of the effect and significance of varying the dimensions of the clearance spaces in bearings according to the invention, the necessary dimensions of the various parts to provide clearance spaces suitable to enable the bearings to deal safely with any predetermined end load can be determined initially and the bearings can then be manufactured to the dimensions thus established.

Further, in determining the dimensions of the clearance space, it may be desirable to take into account the effect of the radial load in reducing the radial dimensions of the clearance space at one side of the bearing, and on this account it may be desirable slightly to increase the dimensions of the clearance space beyond what appears necessary from tests on the bearing when not loaded radially. Alternatively, test apparatus may be provided for applying both radial and axial loads to the bearing, and the appropriate radial load may be applied while carrying out the axial loading tests to determine the dimensions of the clearance space.

A further factor to be noted in determining the design is that, in order for the bearing to achieve the optimum condition under axial load indicated in Figure 6, the extension, which remains at constant volume, must find a space which will receive it entirely. This space is represented by the annular clearance space, plus the (frustoconical) volume created by the movement of the inner portion of the rubber bushing to the right with the inner member, plus a small additional volume provided by an inward bulging movement of the whole mass of rubber under the hydraulic pressure of the trapped rubber extension. Consequently, the volume of rubber which projects beyond the end of the outer member should not exceed that which can be received within the space thus available if optimum performance is to be realized.

Figure 1:
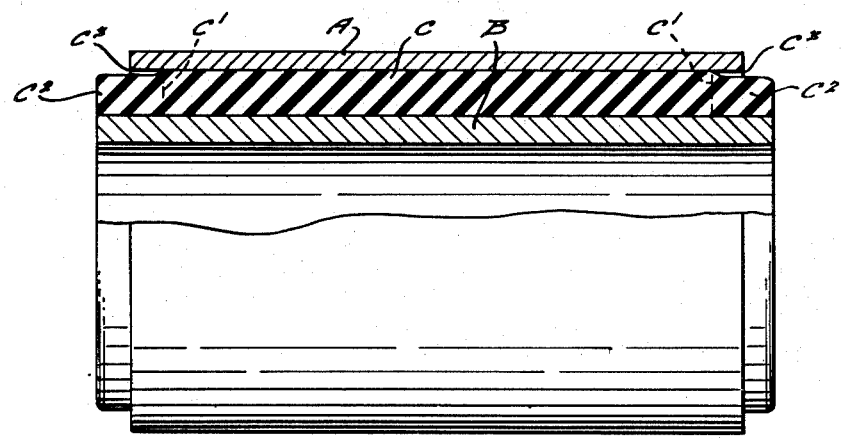
Figure 1 is a sectional side elevation in a plane containing the axis of one form of the improved bearing.

For use on passenger automobile shackles, a bearing having approximately the proportions and clearance space shown in Figures 1 and 3 has been found satisfactory.

While, as previously indicated, optimum performance is realized when the bearing can assume the condition illustrated in Figure 6, a very marked improvement in performance over prior bearings can be achieved without entirely eliminating the possibility of pinching the rubber between the outer sleeve and the shoulder, so long as the expected loads are not sufficient to cause appreciable damage. Thus, bushings having a clearance corresponding to that represented by the line 4 in Figure 5 give excellent results, and for many purposes a clearance which will mark the bushing at a point spaced to a substantial degree from the end of the external sleeve, such as indicated by the line 3 in Figure 5, is satisfactory. In such cases, it is desirable to avoid a sharp edge or burr on the external member, and advantageous to provide a slight chamfer.

It is undesirable to provide more annular clearance space than is just sufficient to permit complete entry of the extension into the outer bearing member, since excessive clearance reduces the axial load capacity of the bearing.

Figure 2:
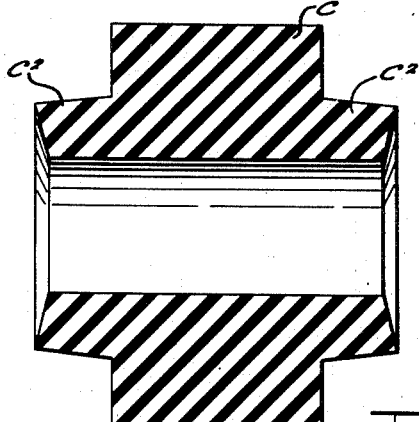
Figure 2 is a side elevation of the rubber bushing used in the bearing shown in Figure 1 before assembly.

While, as previously indicated, the rubber bushing C may be molded to the form shown in Figure 1 and bonded to the inner and external members A and B at the areas of contact by any suitable rubber cement or bonding process, the preferred form of the invention embodies a rubber bushing which is molded to the form illustrated in Figure 2. As there shown, the bushing, in its free state, has a central portion of substantially greater radial thickness than the radial space between the bearings members A and B, and the central portion of the bushing is radially compressed and axially elongated on assembly. The tendency of the bushing to return to its free state produces a strong frictional adherence between the rubber bushing and the bearing members without the need for any cementing materials.

In order to enhance the adherence between the rubber bushing and the inner bearing member B, it is preferred that the bushing C, in its free state, have an internal diameter less than the external diameter of the inner bearing member B. In that case, in order to produce extensions which on assembly are cylindrical externally and have ends lying in transverse planes, the extension portions $C^2$, in their free state, have external surfaces of frusto-conical form, tapering slightly toward their outer extremities, and have relatively flat frusto-conical ends, as shown in Figure 2.

In order to obtain optimum performance on relative oscillation between the inner and outer members, the radial thickness of the central portion of the bushing C is preferably reduced in thickness to approximately one-half or less of its thickness in its free state, with the result that the central portion of the finally assembled bushing is approximately twice or more the axial length of the bushing in its free state. It will be obvious that reduction in radial thickness could be achieved either by reducing the outside diameter or increasing the inside diameter of the bushing. However, in bushings of the type to which the present invention relates, there is a greater tendency of slippage between the rubber bushing and the inner bearing member than between the rubber bushing and the outer bearing member and, consequently, it is preferred to both increase the inner diameter of the bushing and decrease the outer diameter. Moreover, the increase in the inner diameter should at least equal and preferably exceed the amount of decrease in the outer diameter, as shown in Figures 1 and 2 of the drawings.

The external diameter of the extensions $C^2$, when the rubber bushing is in its free state, must be sufficiently less than the internal diameter of the external member so that the necessary clearance space $C^3$ exists after assembly. In this connection, allowance must be made for any expansion of the internal diameter of the bushing on assembly.

Bearings constructed in accordance with the preferred form of the invention may be assembled by the apparatus disclosed in applicant's copending application on "Apparatus for Assembling Rubber Bearings," Serial No. 766,204, filed concurrently herewith.

Bearings constructed in accordance with the present invention appear to be totally unaffected by repeated axial shock loads of sufficient magnitude to cause metal to metal contact, and are far more resistant to such loads than prior bearings. At the same time, they are as effective in sustaining radial loads and relative oscillation between the bearing members as the best prior mechanical rubber bearings. Moreover, the life of such bearings under repeated oscillations is markedly longer than similar bearings without the rubber extensions. While the above mentioned specific uses to which the bearing may be put require limited relative rotation between the inner and outer members, it will be apparent that the advantages of the invention are fully realized even though no such rotation occurs. Thus, the invention may be employed in any flexible mountings which are subject to axial or combined radial and axial loads without relative rotation.

What is claimed is:

1. A yielding mounting comprising an inner member, an annular external member surrounding the inner member in radially spaced relation thereto, the outer surface of the inner member and the inner surface of the outer member in all sections taken through both members transverse to the axis of said annular member defining circles, one of said member being formed with an abutment surface at one end and facing toward said end and the other member projecting toward said end beyond said abutment surface, and an annular bushing of elastic rubber-like material fitted between and adhering to said members, said bushing having an end portion a portion of which is located in the transverse plane of said abutment surface and said end portion extending axially in both directions beyond said abutment surface, said end portion being spaced radially from said one member and in non-slipping engagement with the other member.

2. A yielding mounting comprising an inner member, an annular external member surrounding the inner member in radially spaced relation thereto, the outer surface of the inner member and the inner surface of the outer member in all sections taken through both members transverse to the axis of said annular member defining circles, one of said members being formed with an abutment surface at one end and facing toward said end and the other member projecting toward said end beyond said abutment surface, means on said other member forming a second abutment surface axially spaced from and facing the first abutment surface, and an annular bushing of elastic rubber-like material fitted between and adhering to said members, said bushing having an end portion a portion of which is located in the transverse plane of said first abutment surface and said end portion extending axially in both directions beyond said first abutment surface and engaging said second abutment surface, said end portion being spaced radially from said one member and in on-slipping engagement with the other member.

3. A yielding mounting comprising an inner member, an annular external member surrounding the inner member in radially spaced relation thereto, the outer surface of the inner member and the inner surface of the outer member in all sections taken through both members transverse to the axis of said annular member defining circles, one of said members being formed with an abutment surface at one end and facing toward said end and the other member projecting toward said end beyond said abutment surface, and an annular bushing of elastic rubber-like material fitted between and adhering to said members, said bushing having an end portion a portion of which is located in the transverse plane of said abutment surface and said end portion extending axially in both directions beyond said abutment surface, said end portion being spaced radially from said one member and in non-slipping engagement with the other member, the axial distance between said abutment surface and the outer extremity of said end portion of the bushing and the radial thickness of said end portion and the radial and axial dimensions of said space between the end portion of the bushing and said one member being so correlated that when the plane of the extremity of said end portion is moved into the plane of said abutment surface with a corresponding movement of the other member substantially none of said end portion will bulge over or contact said abutment surface.

4. A yielding mounting comprising an inner member, an annular external member surrounding the inner member in radially spaced relation thereto, the outer surface of the inner member and the inner surface of the outer member in all sections taken through both members transverse to the axis of said annular member defining circles, one of said members being formed with an abutment surface at one end and facing toward said end and the other member projecting toward said end beyond said abutment surface, means on said other member forming a second abutment surface axially spaced from and facing the first abutment surface, and an annular bushing of elastic rubber-like material fitted between and adhering to said members, said bushing having an end portion a portion of which is located in the transverse plane of said first abutment surface and said end portion extending axially in both directions beyond said first abutment surface and engaging said second abutment surface, said end portion being spaced radially from said one member and in non-slipping engagement with the other member, the axial distance between said abutment surfaces and the radial thickness of said end portion of the bushing and the radial and axial dimensions of said space between the end portion of the bushing and said one member being so correlated that when the members are moved relatively and axially in a direction to cause engagement of said abutment surfaces substantially all of said end portion will be forced into said one member and beyond said first mentioned abutment surface without bulging and becoming pinched between said abutment surfaces.

5. A yielding mounting comprising an inner member, an annular external member surrounding the inner member in radially spaced relation thereto, the outer surface of the inner member and the inner surface of the outer member in all sections taken through both members transverse to the axis of said annular member defining circles, one of said members being formed with an abutment surface at one end and facing toward said end and the other member projecting toward said end beyond said abutment surface, means on said other member forming a second abutment surface axially spaced from and facing the first abutment surface, and an annular bushing of elastic rubber-like material fitted between and adhering to said members, said bushing having an end portion a portion of which is located in the transverse plane of said first abutment surface and said end portion extending axially in both directions beyond said first abutment surface and engaging said second abutment surface, said end portion being spaced radially from said one member, the adjacent portion of said bushing being substantially reduced in radial thickness as compared to its thickness in its free state in order to effect frictional adherence of said bushing portion to said members, the axial distance between said abutment surfaces and the radial thickness of said end portion of the bushing and the radial and axial dimensions of said space between the end portion of the bushing and said one member being so correlated that when the members are moved relatively and axially in a direction to cause engagement of said abutment surfaces substantially all of said end portion will be forced into said one member and beyond said first mentioned abutment surface without bulging and becoming pinched between said abutment surfaces.

6. An oscillating bearing adapted to sustain axial and radial loads, comprising an inner bearing member having a substantially cylindrical outer surface, an external bearing housing having an inner cylindrical surface concentric with and surrounding said member and terminating at at least one end short of and in axially spaced relation to the corresponding end of the member, and an annular bushing of elastic rubber-like material fitted between said member and housing, said bushing having an end portion which is in a state of circumferential tension around said member and is of smaller external diameter than the internal diameter of said housing, said end portion lying partly within the housing and projecting beyond the adjacent end of the housing, said member having a surface at the corresponding end thereof adapted to locate the axial position of an end abutment member in engagement with the end of said end portion of the bushing, the adjacent portion of said bushing being substantially reduced in radial thickness as compared to its thickness in its free state in order to effect frictional adherence of said bushing portion to said member and housing.

7. An oscillating and axially movable bearing, comprising an inner member, an external housing coaxially surrounding the inner member in radially spaced relation thereto, the outer surface of the inner member and the inner surface of the housing in all sections taken through both said member and housing transverse to the axis of said member and housing defining circles, the housing being of less axial length than the inner member and terminating at both ends short of the ends of the inner member, and an annular bushing of elastic rubberlike material fitted between said members, said bushing having end portions which are of smaller external diameter than the internal diameter of the housing and each of which extend axially in both directions from the adjacent end of the housing, said end portions being in a state of circumferential tension around the inner member whereby they adhere thereto and the intermediate portion of the bushing being in a radially compressed and axially extended condition as compared with its free state whereby it adheres to the inner member and housing.

8. An oscillating and axially movable bearing, comprising an inner member, an external housing coaxially surrounding the inner member in radially spaced relation thereto, the outer surface of the inner member and the inner surface of the housing in all sections taken through both said member and housing transverse to the axis of said member and housing defining circles, the housing being of less axial length than the inner member and terminating at both ends short of the ends of the inner member, and an annular bushing of elastic rubberlike material fitted between said members, said bushing having end portions which are of smaller external diameter than the internal diameter of the housing and each of which extends axially in both directions from the adjacent end of the housing, said end portions being in a state of circumferential tension around the inner member whereby they adhere thereto and the intermediate portion of the bushing being in a radially compressed and axially extended condition as compared with its free state whereby it adheres to the inner member and housing, the axial distance between each end of the housing and the extremity of the adjacent end portion of the bushing and the radial thickness of said end portion and the axial distance between each end of the housing and the adjacent extremity of the intermediate portion of the bushing being so correlated with respect to the diameters of said surfaces of the inner member and housing that when the plane of the extremity of either end portion is moved into the plane of the adjacent end of the housing with a corresponding movement of the inner member substantially none of said end portion will bulge over or contact said end of the housing.

9. An oscillating and axially movable bearing, comprising an inner member, an external housing coaxially surrounding the inner member in radially spaced relation thereto, the outer surface of the inner member and the inner surface of the outer member in all sections taken through both members transverse to the axis of said annular members defining circles, and an annular bushing of elastic rubberlike material fitted between said members, said bushing having end portions and an intermediate portion, said bushing having the external diameter of its intermediate portion reduced from its free diameter and its entire internal diameter increased from its free diameter by at least as much as the external diameter of the intermediate portion is reduced whereby the intermediate portion is in an axially elongated state and makes pressure contact with the inner member and housing and the end portions are in a state of circumferential tension and make pressure contact only with the inner member.

10. An oscillating and axially movable bearing, comprising an inner member, an external housing coaxially surrounding the inner member in radially spaced relation thereto, the outer surface of the inner member and the inner surface of the outer member in all sections taken through both members transverse to the axis of said annular members defining circles, the housing being of less axial length than the inner member and terminating at both ends short of the ends of the inner member, and an annular bushing of elastic rubberlike material fitted between said members, said bushing having end portions and an intermediate portion, said bushing having the external diameter of its intermediate portion reduced from its free diameter and its entire internal diameter increased from its free diameter by at least as much as the external diameter of the intermediate portion is reduced whereby the intermediate portion is in axially elongated state and makes pressure contact with the inner member and housing and the end portions are in a state of circumferential tension and make pressure contact only with the inner member, said end portions being of smaller diameter than the internal diameter of the surrounding portions of the housing and each end portion extending axially in both directions from the adjacent end of the housing.

11. A rubber bushing for use in a rubber bearing of the type consisting of a pair of concentric sleeves connected by an intermediate bushing of radially compressed and axially elongated rubber, said bushing in its free state having a major portion thereof intermediate its ends of substantially greater radial thickness than the maximum radial thickness of the end portions, said major and end portions being of substantially the same internal diameter and the exterior of the bushing having abrupt shoulders at the juncture of the end portions with the intermediate portion.

12. A rubber bushing for use in a rubber bearing of the type consisting of a pair of concentric sleeves connected by an intermediate bushing of radially compressed and axially elongated rubber, said bushing in its free state having a major portion thereof intermediate its ends of approximately twice the radial thickness of the maximum radial thickness of the end portions, said major and end portions being of substantially the same internal diameter and the exterior of the bushing having abrupt shoulders at the juncture of the end portions with the intermediate portion.

PHILIP C. HUTTON.

REFERENCES CITED

The following references are of record in the file of this patent:

UNITED STATES PATENTS

| Number | Name | Date |
|---|---|---|
| 988,119 | Livingston et al. | Mar. 28, 1911 |
| 1,739,270 | Thiry | Dec. 10, 1929 |